United States Patent [19]
Knapp

[11] 4,027,606
[45] June 7, 1977

[54] PLANTER APPARATUS

[75] Inventor: Philip B. Knapp, Lynbrook, N.Y.

[73] Assignee: Minnesota Mining and Manufacturing Company, St. Paul, Minn.

[22] Filed: Nov. 28, 1975

[21] Appl. No.: 636,112

[52] U.S. Cl. .................................. 111/77; 111/85; 198/616; 222/613; 222/352

[51] Int. Cl.$^2$ ............... A01C 5/00; A01C 7/18; A01C 7/04

[58] Field of Search ............. 111/9, 12, 13, 14, 19, 111/21–24, 32, 54–56, 60, 62, 63, 77, 78, 36, 85, 59, 34, 83; 222/176, 177, 352; 221/162, 219; 198/616

[56] References Cited

UNITED STATES PATENTS

| | | | |
|---|---|---|---|
| 523,954 | 7/1894 | Baldwin | 221/219 |
| 2,221,909 | 11/1940 | Clanin | 111/59 |
| 2,955,550 | 10/1960 | Downey | 111/59 |
| 3,022,754 | 2/1962 | Sorensen et al. | 111/63 X |
| 3,598,069 | 7/1971 | Hatcher | 111/62 |
| 3,611,956 | 10/1971 | Moore | 111/62 |
| 3,912,122 | 9/1975 | Knapp | 111/77 X |

FOREIGN PATENTS OR APPLICATIONS

| | | | |
|---|---|---|---|
| 1,296,185 | 5/1962 | France | 222/177 |
| 1,131,444 | 6/1962 | Germany | 111/78 |
| 907,004 | 7/1962 | United Kingdom | 111/77 |

Primary Examiner—Edgar S. Burr
Assistant Examiner—James R. Feyrer
Attorney, Agent, or Firm—Cruzan Alexander; Donald M. Sell; John C. Barnes

[57] ABSTRACT

A planter for planting disk-shaped environmental seed cells which are formed of low-density readily-crumbled, compressed pulverulent material. The planter apparatus comprises a planter chassis supported from a tool bar of a tractor and pivotally supported thereon and resiliently urged at each end into contact with the ground. The planter comprises means for separating seed disks in the hopper and transferring seed cells therefrom in a file along a pair of inclined rollers driven in the same direction to dispense the seed disks individually through a chute into a furrow formed by a furrow shoe. The row of seeds is then compacted by a packing wheel which is also resiliently urged into ground-engaging contact from the support bar and serves to drive the separating and conveying rollers on the planter.

5 Claims, 6 Drawing Figures

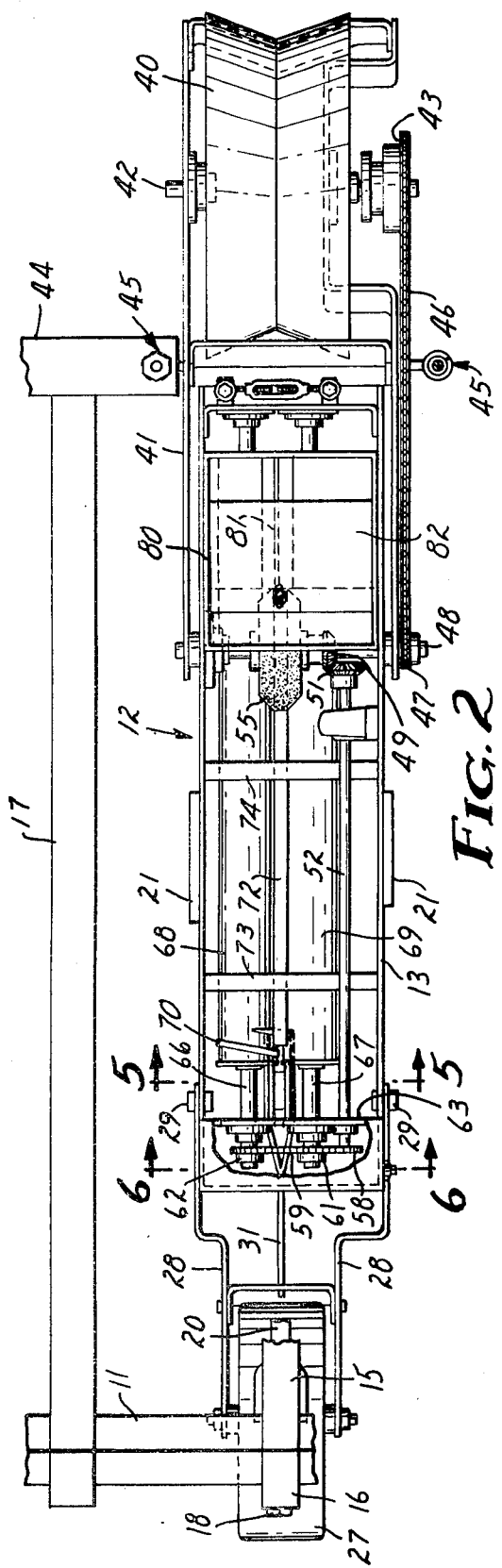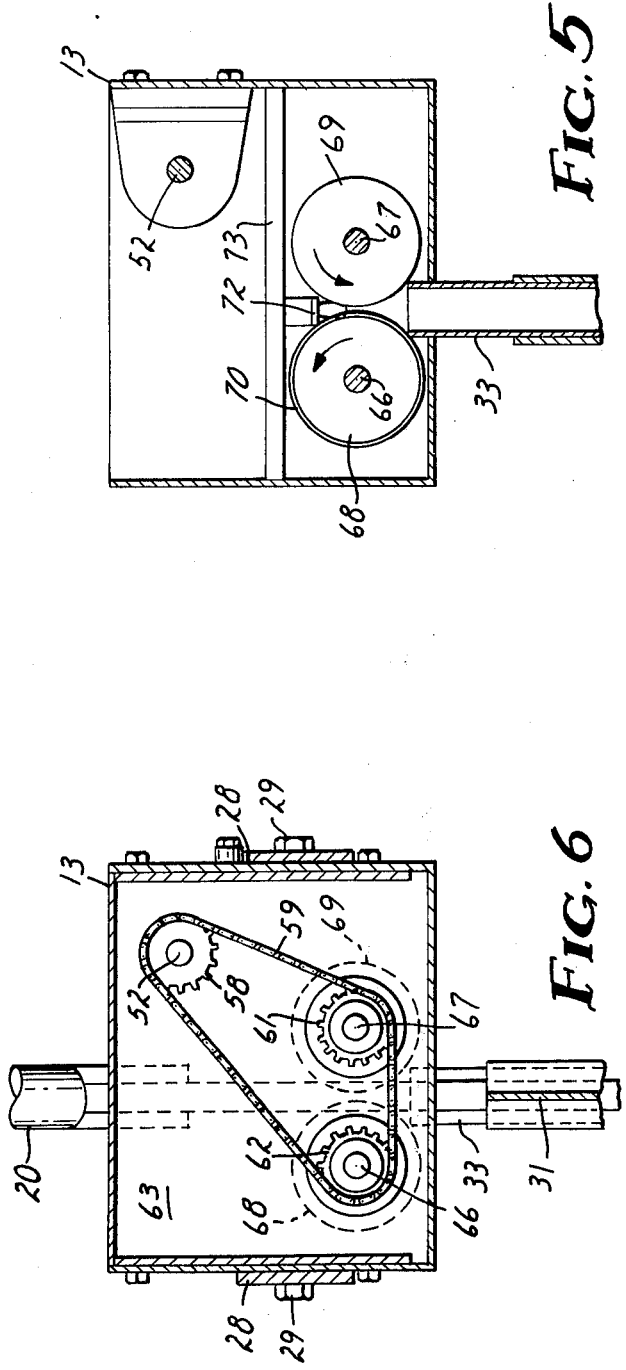

PLANTER APPARATUS

BACKGROUND OF THE INVENTION

1. Field of the Invention

The present invention provides an improvement in planting apparatus for use with environmental seed cells or disks as exemplified by the disks of U.S. Pat. No. 3,690,034, issued Sept. 12, 1972 to Philip B. Knapp. This application is directed to an improvement on the planter apparatus disclosed in U.S. Pat. No. 3,912,122, issued Oct. 14, 1975 to Philip B. Knapp and Jon R. Zogg.

2. Discussion of the Prior Art

The planter apparatus of the U.S. Pat. No. 3,912,122 provides means for singulating seed disks dispensed from a hopper and for moving the seed cells along a slot formed between two closely positioned parallel oppositely driven rollers having a friction coating until the seed disks reached the lower end of the inclined roller and were dropped through a slot, formed by a recess at the leading end portion of said rollers, into the furrow. The planter apparatus of this patent utilized traction wheels separate from the planter modules to drive a common drive shaft connected to several moving parts of the modules used for separating the seed disks.

While this structure provides for the separation of the seed disks from the hopper and transfers the same to the discharge chute, the planter structure tended to vibrate causing the seeds to be unevenly conveyed toward the discharge chute and the same were not positively fed from the ends of the rollers through the opening in one of the rollers to the discharge chute.

The planter apparatus of the present invention utilizes a drive system which is integral with each of the planter modules, each of which are independently pivotally supported from a common tool bar and biased therefrom for positive engagement with the ground surface. The structure of the planter apparatus is similar to that of the earlier application as concerns the separation of the seed cells, but the same are transferred in the present device from the separating mechanism to the dispensing end of the chassis by a pair of parallel knurled rollers which are driven in the same direction, thus maintaining greater control of the seed cell by continual contact therewith to advance the same along the incline rollers to the discharge end. The knurl in the rollers is helical and at an angle of about 20° to the axis. At the discharge end of the rollers one of the rollers is provided with a helical rib which positively drives a seed cell from the end of the rollers into the discharge chute. From the discharge chute the seed cell falls into a furrow formed by the furrow shoe, and is then packed by the trailing packing wheel. The packing wheel serves to drive the inclined disk transport rollers and the separating mechanism in the planter. The planter chassis is mounted by parallel linkages and is urged toward the ground by two spring dampening members from the tool bar. One of the dampening members also urges the packing wheel into engagement.

SUMMARY OF THE INVENTION

The present invention relates to an improvement in planting apparatus particularly adapted for planting environmental seed disks. The planter apparatus comprises means for separating disks stored in a bulk hopper on the planter and transporting the disks along a guide channel to a dispensing means which dispenses the seed disks from the planter by discharging them through a chute into a furrow. The planter apparatus is biased into ground engagement from a tool bar and the driven members of the separating and dispensing mechanism are driven from the individual planter packing wheel. Each planter apparatus is a module of a complete multirow planter unit which module may be mounted in transversely spaced relationship along a tool bar which may be tractor mounted to draw and support the planter apparatus for movement over the ground during planting or transport. The dispensing means of the present invention comprises a pair of inclined parallel knurled rollers driven in the same direction and positioned in spaced relation but closer together than the height of the seed disks. The dispensing means feeds the seed disks through a singulating and spacing area where they are placed in a file to the seed chute. Each planter module chassis is urged into ground engagement from the tool bar by spring dampening members positioned adjacent each end. The rear spring biases the packer wheel and the chassis downward by being connected between the tool bar supported and the packing wheel frame pivotally connected to the planter chassis.

BRIEF DESCRIPTION OF THE DRAWING

The present invention will be more fully understood after reading the following detailed description which refers to the accompanying drawing wherein:

FIG. 2 is an enlarged plan view of a planter module of the present invention;

FIG. 5 is a detailed cross-sectional view taken along the lines 5—5 of FIG. 2; and FIG. 6 is an enlarged detailed view of the drive taken along the lines 6—6 of FIG. 2.

DETAILED DESCRIPTION OF A PREFERRED EMBODIMENT

Figure 1:
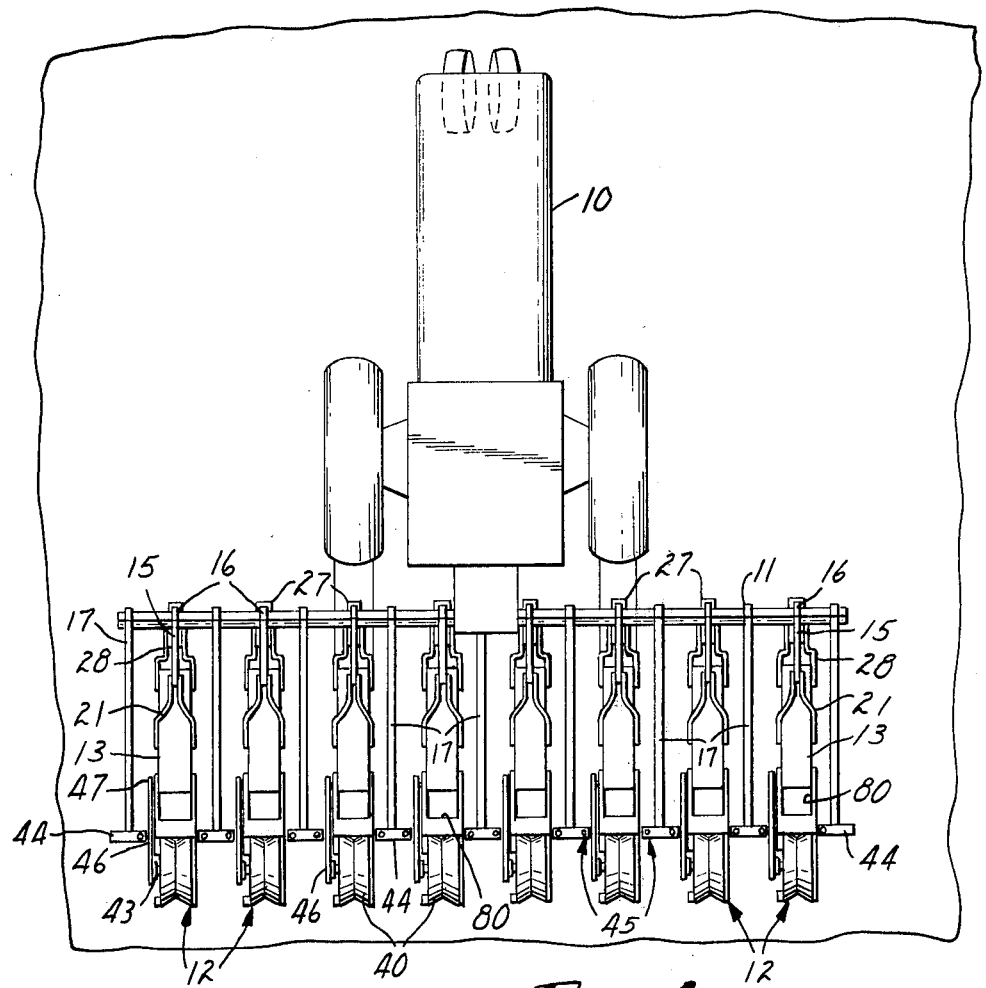
FIG. 1 is a top plan view of a tractor pulling a plurality of planter modules constructed in accordance with the present invention in transversely spaced relation along a tool bar.
Figure 4:
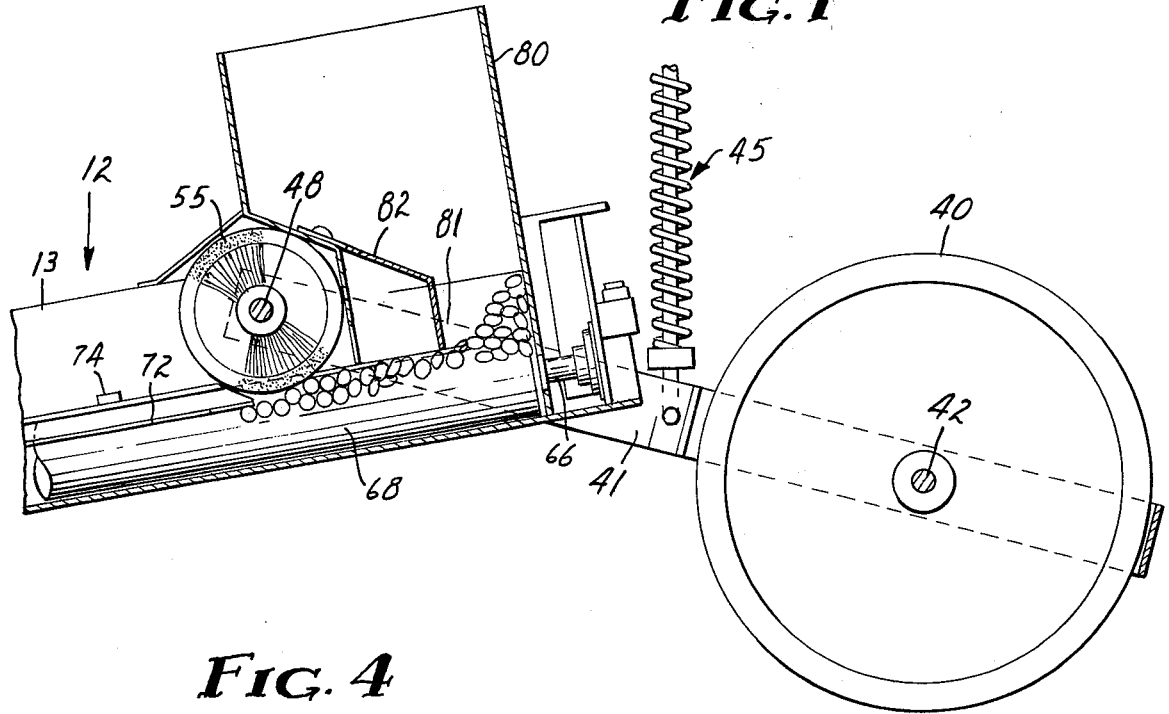
FIG. 4 is an enlarged detailed view of the separating system of a planter module of FIGS. 2 and 3.
Figure 3:
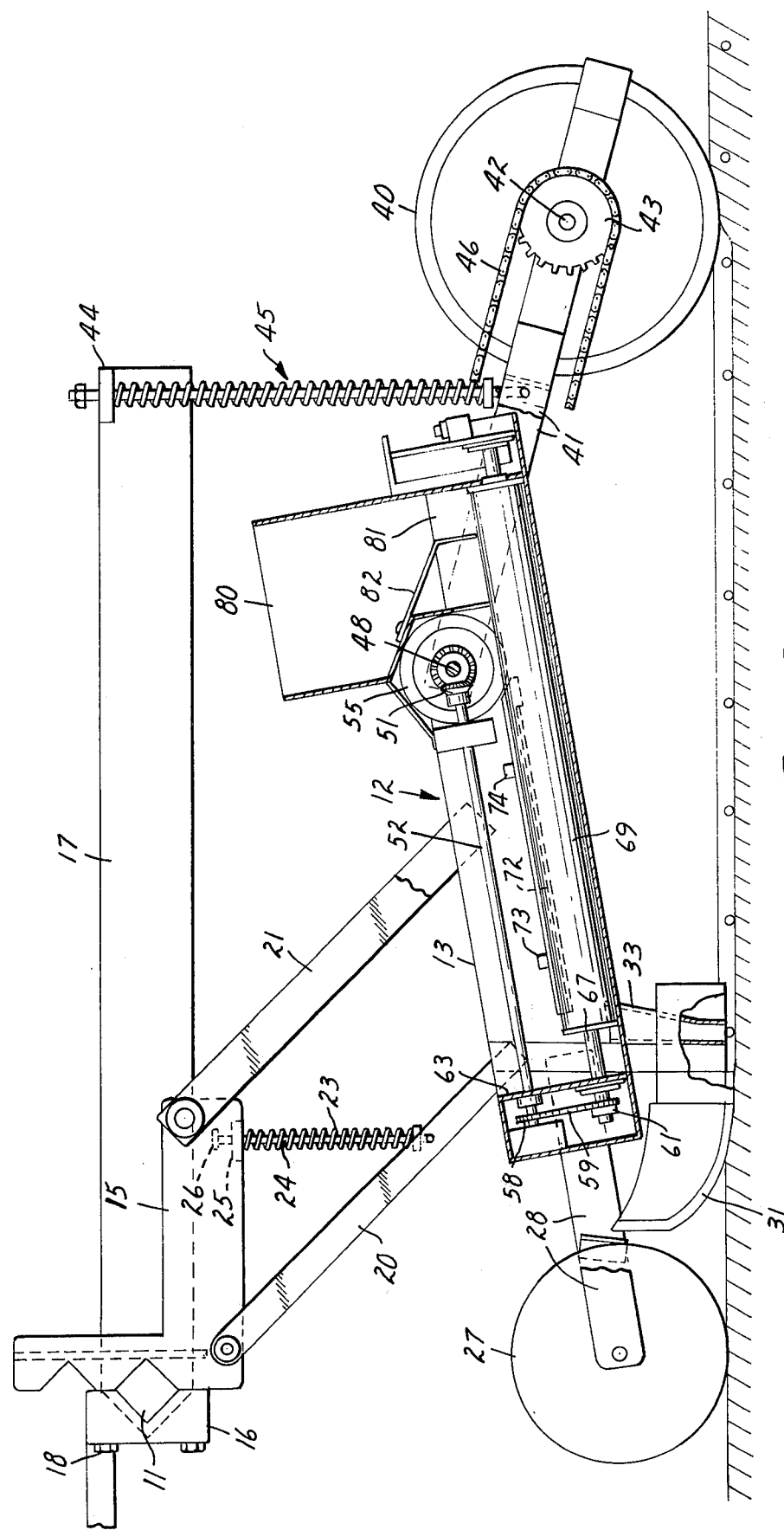
FIG. 3 is an enlarged vertical sectional view of the planter module of FIG. 2.

FIG. 1 discloses a tractor 10 including a tool bar 11 of the type adapted to fit on the hydraulic lift of a tractor to which tool bar 11 a series of planter modules or units 12 are attached. The planter modules 12 are positioned in transversely spaced relationship along the tool bar to provide the proper spacing between the rows of plants. The planter modules are supported from the tool bar 11 by L-shaped brackets 15 and spaced rearwardly extending cantilever beams. Each L-shaped bracket 15 and beam 17 is formed to be rigidly secured by a U-bolt 18 to the tool bar 11. The brackets 15 provide support for and draw the planter modules 12. The foot portion of each L-shaped bracket 15 has secured pivotally thereto two links 20 and 21 forming a parallelogram linkage by their pivotal connection to the chassis 13 of the planter module. The links 20 and 21 as seen in FIG. 3 serve to draw the planter module from the bracket member 15 and a compression spring 23 is connected between the bracket 15 and the link 20 to apply the force from the tool bar 11 to the chassis to hold the same in engagement with the ground as the vertical position of the tool bar may vary during movement of the tractor across the field and will maintain the module in contact with the ground. This spring member 23 is positioned around a vertically supported rod 24, which rod 24 is connected to the link 20 and extends through an ear 25 on the bracket 15. The rod 24 is formed with a stop 26 to keep it from passing through the opening in the bracket ear 25.

The chassis 13 is supported at the leading end by a ground engaging first support wheel 27 supported from the chassis by a yoke 28. The wheel 27 provides depth control by limiting the pivotal movement of the yoke 28 about the pivot axis defined by pins 29 which support the yoke on the chassis.

Supported below the forward or leading end of the chassis 13 is a furrow shoe 31 in the center of which is a fixed seed chute 33. The seed chute 33 has an open end disposed to catch the metered seed disks to discharge the seed disk into the furrow shoe 31.

A packer wheel 40 is supported from the trailing end of the chassis and is pivotally supported from the chassis by a yoke 41. The packer wheel 40 is mounted on a shaft 42 journalled by the yoke 41, and the shaft 42 has a sprocket 43 secured at one outboard end thereof. Positioned between the trailing ends of two beams 17 and the yoke 41 are two compressing spring dampening devices 45, positioned such that the weight of the tool bar and any downward force applied through the tool bar by the tractor will be transmitted to the packer wheel 40 while dampening the relative movement between the packer wheel 40 and the beams 17 as the same is driven over the field. The dampening devices comprise a compression spring surrounding a rod and positioned between an ear 44 on the beam 17 and a stop on the rod near the yoke 41. A chain 46 around the sprocket 43 drives a second sprocket wheel 47 positioned on a driven shaft 48 journalled in the chassis to afford a drive connection between the packer wheel 40 and the chassis. The drive shaft 48 extends through the chassis and has keyed thereto a first beveled gear 49 which meshes with a beveled gear 51 on the end of a journalled shaft 52 which shaft 52 transfers the torque to the forward end of the chassis. Also keyed to the driven shaft 48 is a circular wiper brush 55 which is positioned generally centrally of the chassis and which serves to orient the seed disks as will hereinafter be described.

The drive shaft 52 extends parallel to the chassis and at the forward end thereof is provided a sprocket 58 about which is trained a chain 59. The chain 59 as shown most clearly in FIG. 6 goes around a pair of sprockets 61 and 62 fixed to the ends of shafts extending through a partition wall 63. The shafts 66 and 67 support a pair of parallel journalled spaced rollers 68 and 69 and the shafts are journalled adjacent at their opposite ends in suitable bearinged supports. The rollers 68 and 69 are both knurled with a knurl of 20° to the roller axis to transport the seed disks along the rollers. One of the rollers, roller 68, is provided with a projecting helical rib 70 having a 15° thread as shown most clearly in FIGS. 2 and 5, which serves to positively engage and advance a seed disk edgewise from the trailing end of the parallel rollers into the seed chute 33.

The rollers 68 and 69 are spaced apart a distance less than the height or axial thickness of the seed disks 71 and are driven in the same direction by the chain 59, such that a seed will be advanced along the rollers. The incline of the rollers together with the knurl advance the seeds which are placed thereon by the singulating means. The knurl on the roller 69 which is rotating counterclockwise as viewed in FIG. 5 is finer than the knurl on the roller 68. A seed guide 72, which is a rectangular rib, is disposed over the slot formed between the rollers such that the seed disks 71 (as shown in FIG. 5) moving along the slot on the rollers edgewise are not vibrated out of contact with the rollers and will have less tendency to advance in the file along the slot. The thin seed guide 72 is supported from a pair of braces 73 and 74 which extend transversely across the chassis between two side walls thereof.

Supported at the rear of the chassis and above the ends of the rollers is a seed disk hopper 80 for storing a bulk of the seed disks. This hopper is positioned such that the seed disks will be directed into the bottom thereof and into a funnel-like open-bottomed trough 81 disposed above the slot between the rollers. A baffle plate 82 is positioned at the forward end of the trough 81 such that it will form a chamber behind the wiper brush 55 and restrict the flow of seed disks into this chamber from the hopper. The brush 55 contacts the seed disks as they are advanced through the chamber toward the seed chute. The brush 55 is driven about the axis of shaft 48 which is transverse to the axis of the rollers 68 and 69 and has its periphery disposed above the slot between the rollers. The wheel 55 is driven in a direction opposite the direction of movement of the seed disks, i.e. counterclockwise as seen in FIG. 3, and engages any excess disks to avoid the disks agglomerating above the rollers and in an orderly file therealong toward the discharge end.

The links 20 and 21 maintain the chassis in a generally inclined position relative to the ground as the field is traversed by the planter unit. This incline with respect to the horizontal by the chassis 13 and the pair of rollers 68 and 69 afford the further assistance of gravity in advancing the seed disks along the rollers from the seed singulating means below the hopper to the seed chute.

Having thus disclosed the present invention by way of illustrating the preferred embodiment it is to be appreciated that modifications may be made without departing from the invention as defined in the appended claims.

What is claimed is:

1. A planter module for sowing a row of seed disks which disks comprise a readily crushable material compacted around a seed, said planter module comprising an elongated generally rectangular chassis, and adjustable support wheel connected to said chassis at the leading end thereof to support the leading end a predetermined height above the ground, a pivotally connected rear packing member attached to the trailing end of said chassis, a parallel linkage attached to the leading end of said chassis and including attaching means for attachment to a tractor mounting bar to position said chassis at an incline from the trailing end downward toward the lead end, spring means for resiliently applying a downward force on said linkage and on said packing member from said mounting bar, a pair of parallel spaced knurled rollers disposed lengthwise of said chassis and positioned to be inclined with said chassis, said knurled rollers being disposed side by side and defining therebetween an elongated vertical open slot, the transverse dimension of said space between said rollers being smaller however than the height or axial dimension of the seed disks, means driving said rollers for rotation about their longitudinal axis in the same direction, a hopper positioned on said chassis above the trailing end thereof and having a trough-shaped open bottom for dispensing seed disks edgewise onto said rollers, singulating means affording movement of the seed disks in a file along said rollers from said hopper, furrow opening means trailing said support wheel for forming a furrow, a seed chute positioned at the leading end of said chassis beneath the leading end of said rollers to transfer seeds from the leading end of said rollers to deposit the same in said furrow, one of said rollers having a helical rib means on said leading end for positively engaging and displacing individual seed disks from the slot between the rollers and into said seed chute.

2. A planter module according to claim 1 wherein said singulating means comprises a circular wiper brush driven about an axis transverse to the axis of said rollers and positioned above said slot forwardly of said hopper, the periphery of said brush being disposed above said slot a distance to permit seed disks positioned on edge to pass toward said leading end.

3. A planter module according to claim 1 wherein said spring means comprises a support bracket attached to said attaching means for attachment to a tractor mounting bar and an attaching means to said parallel linkage, a pair of parallel beams, means for connecting said beams to said tractor mounting bar, and spring dampening devices positioned between said bracket and said linkage and between said beams and connecting member for said packing member at a position between said packing member and said chassis.

4. A planter module according to claim 1 wherein a fixed gate is positioned at the leading end of the trough below said hopper to position seed disks moving along said slot upon rotation of said rollers in a file and wherein said singulating means comprises a circular wiper brush driven about an axis transverse to the axis of said rollers and having its periphery disposed above said slot to contact the seed disks and space the same in said file as they are driven by said rollers toward said leading end.

5. A planter module according to claim 4 wherein said spring means comprises
- a support bracket attached to said attaching means for said tractor mounting bar and to said parallel linkage,
- a pair of parallel beams,
- means connecting said beams to said tractor mounting bar in parallel relationship one along each side of said chassis, and
- spring dampening devices positioned between said bracket and said linkage and between said beams and a support for said packing member for transferring force from said tractor mounting bar to said chassis and packing member.

* * * * *